Dec. 4, 1934.  F. B. LITTLE  1,983,236
MECHANISM FOR CONTROLLING ELECTRIC CIRCUITS
Filed March 4, 1932  6 Sheets-Sheet 1
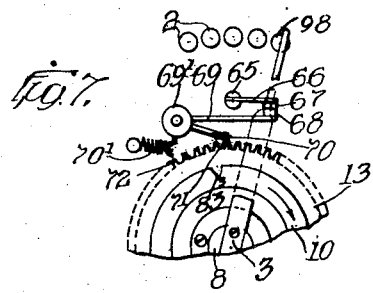
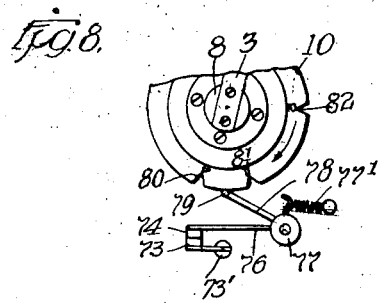
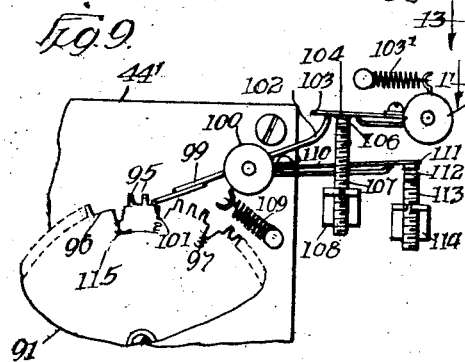
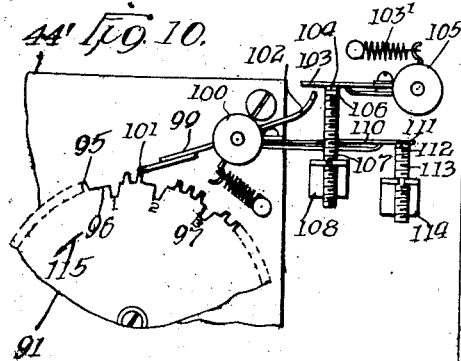
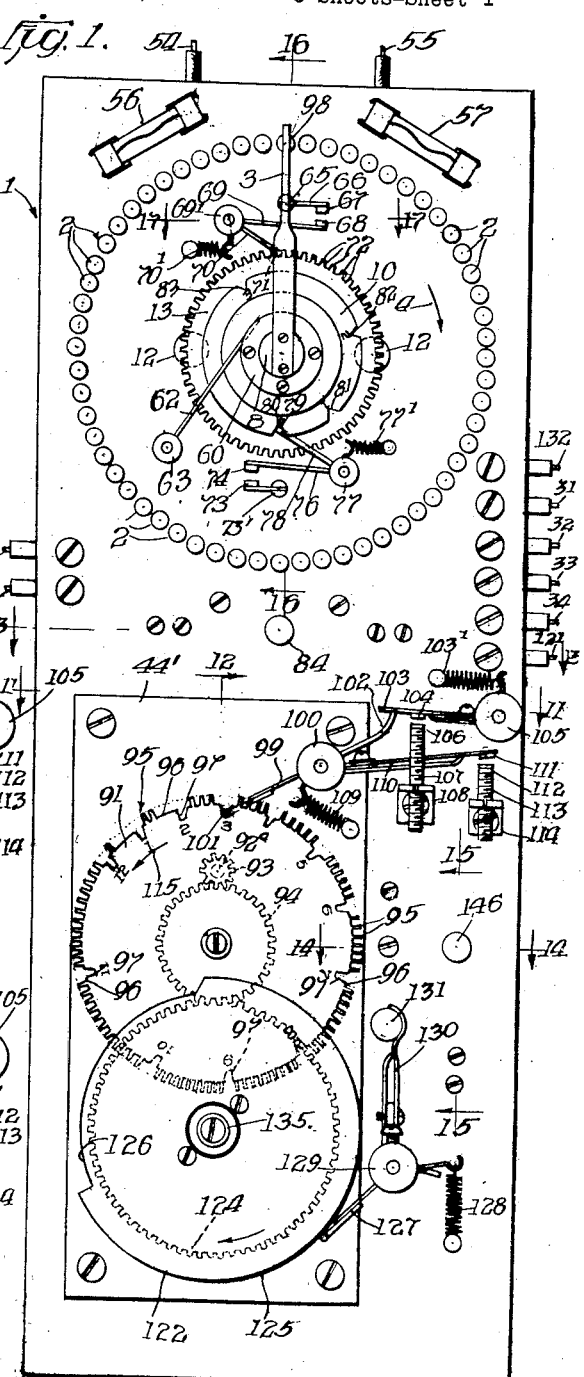
Witnesses:
Harry P. L. White
Inventor
Frederick B. Little
By Edward Fay Wilson
atty Dec. 4, 1934.　　　　F. B. LITTLE　　　　1,983,236
MECHANISM FOR CONTROLLING ELECTRIC CIRCUITS
Filed March 4, 1932　　6 Sheets-Sheet 2
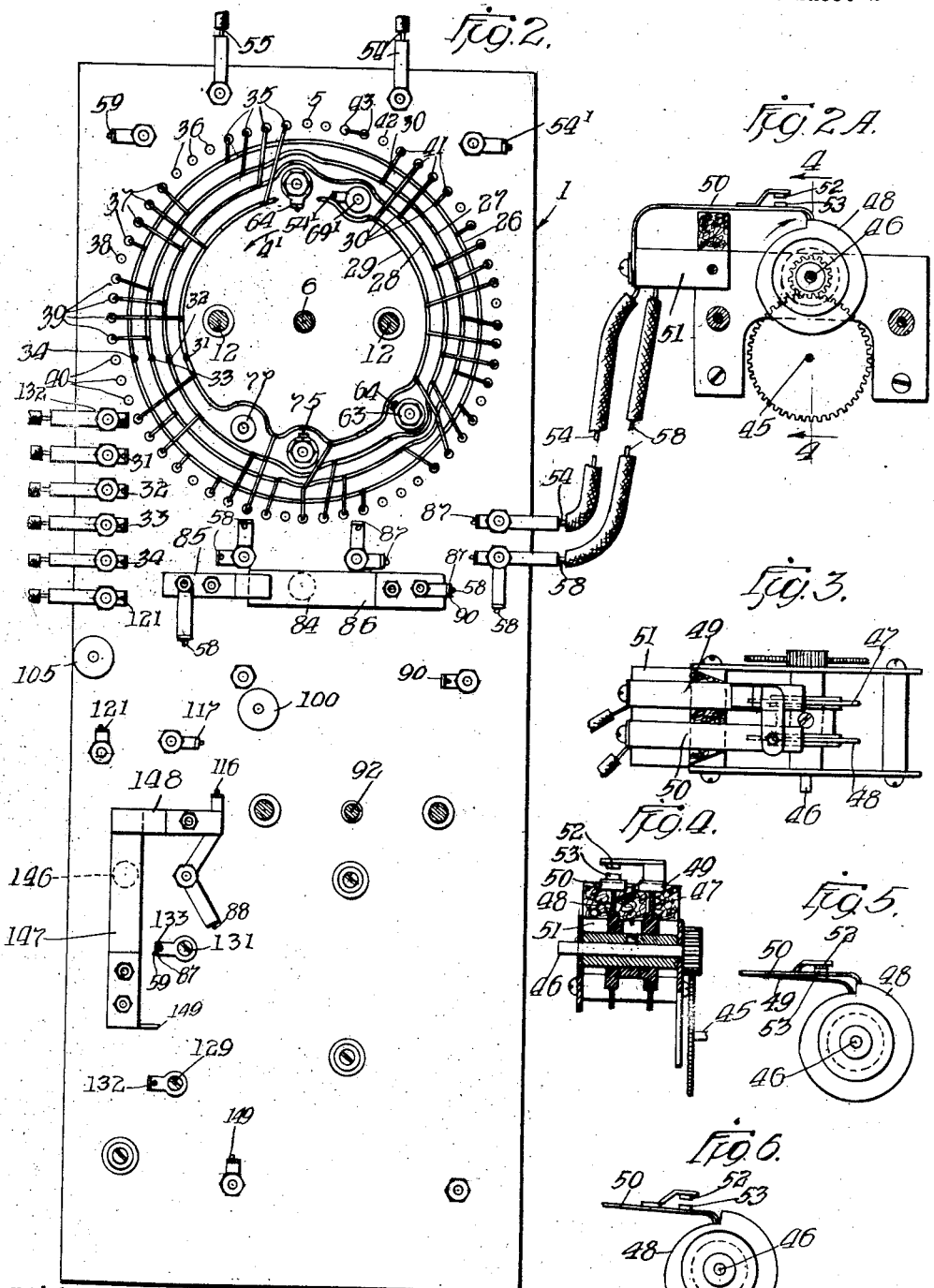
Witnesses
Harry R. L. White
Inventor
Frederick B. Little
By Edward Fay Wilson
atty

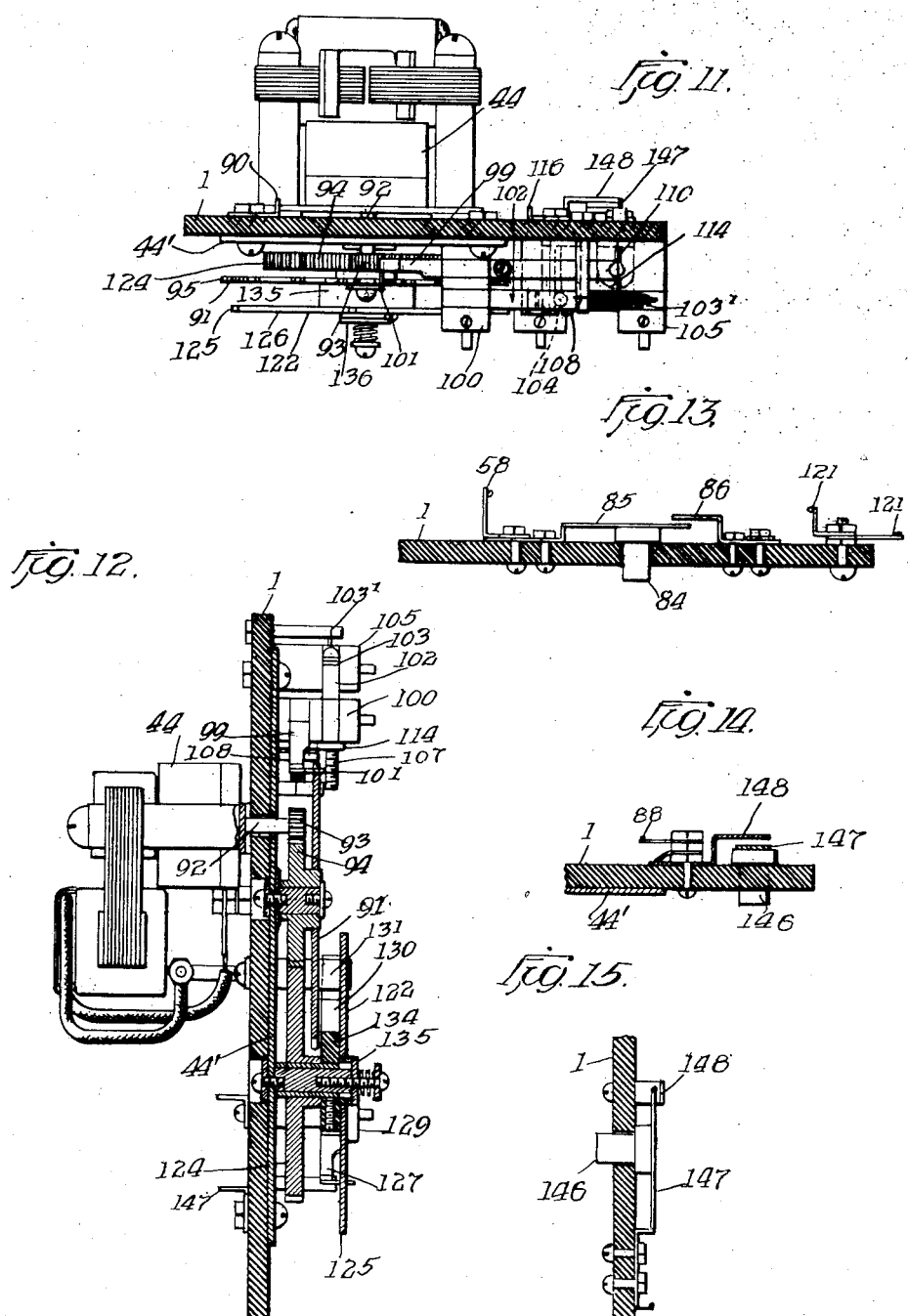

Dec. 4, 1934.　　　　F. B. LITTLE　　　　1,983,236
MECHANISM FOR CONTROLLING ELECTRIC CIRCUITS
Filed March 4, 1932　　6 Sheets-Sheet 4
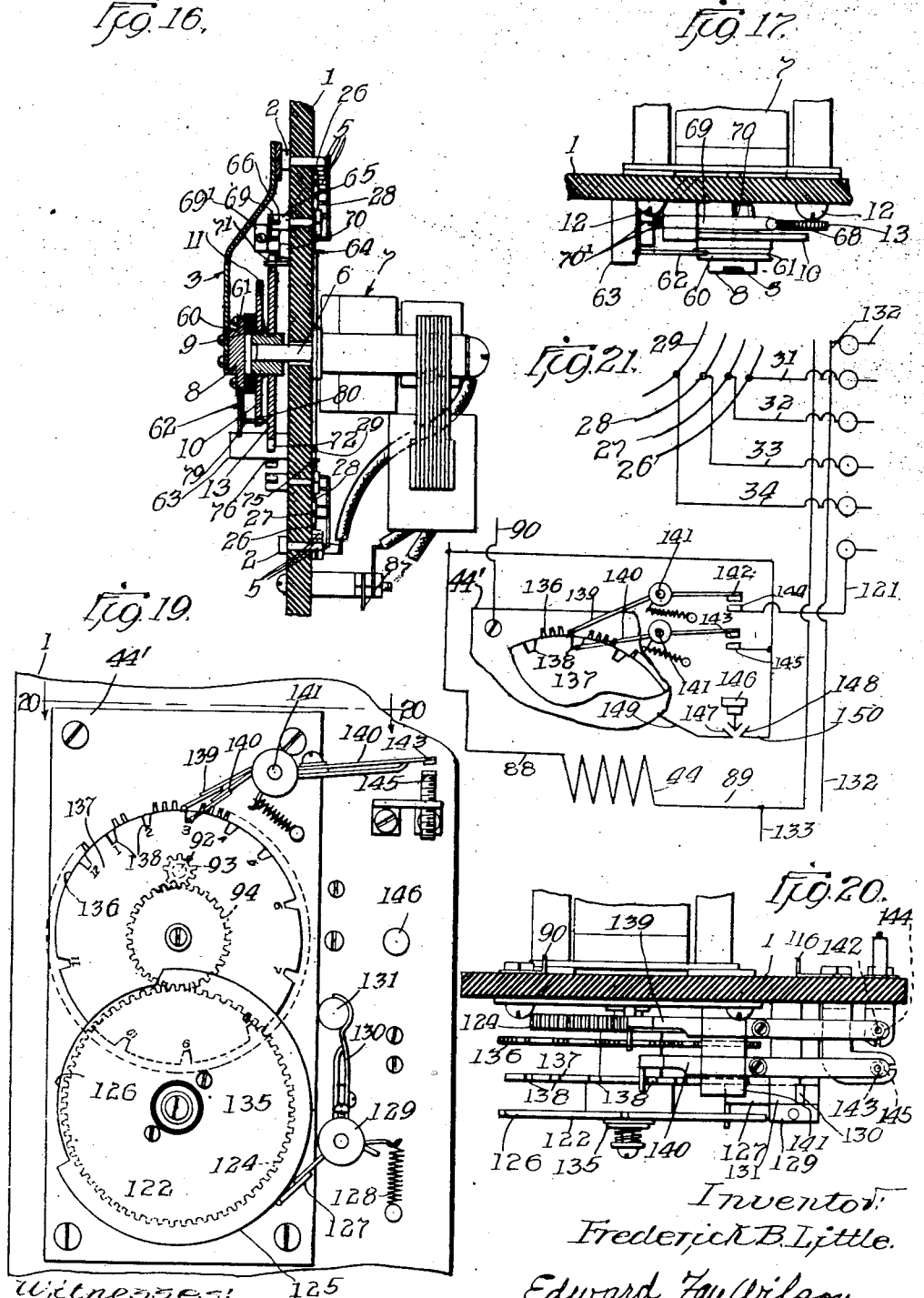
Inventor
Frederick B. Little.
By Edward Fay Wilson
atty

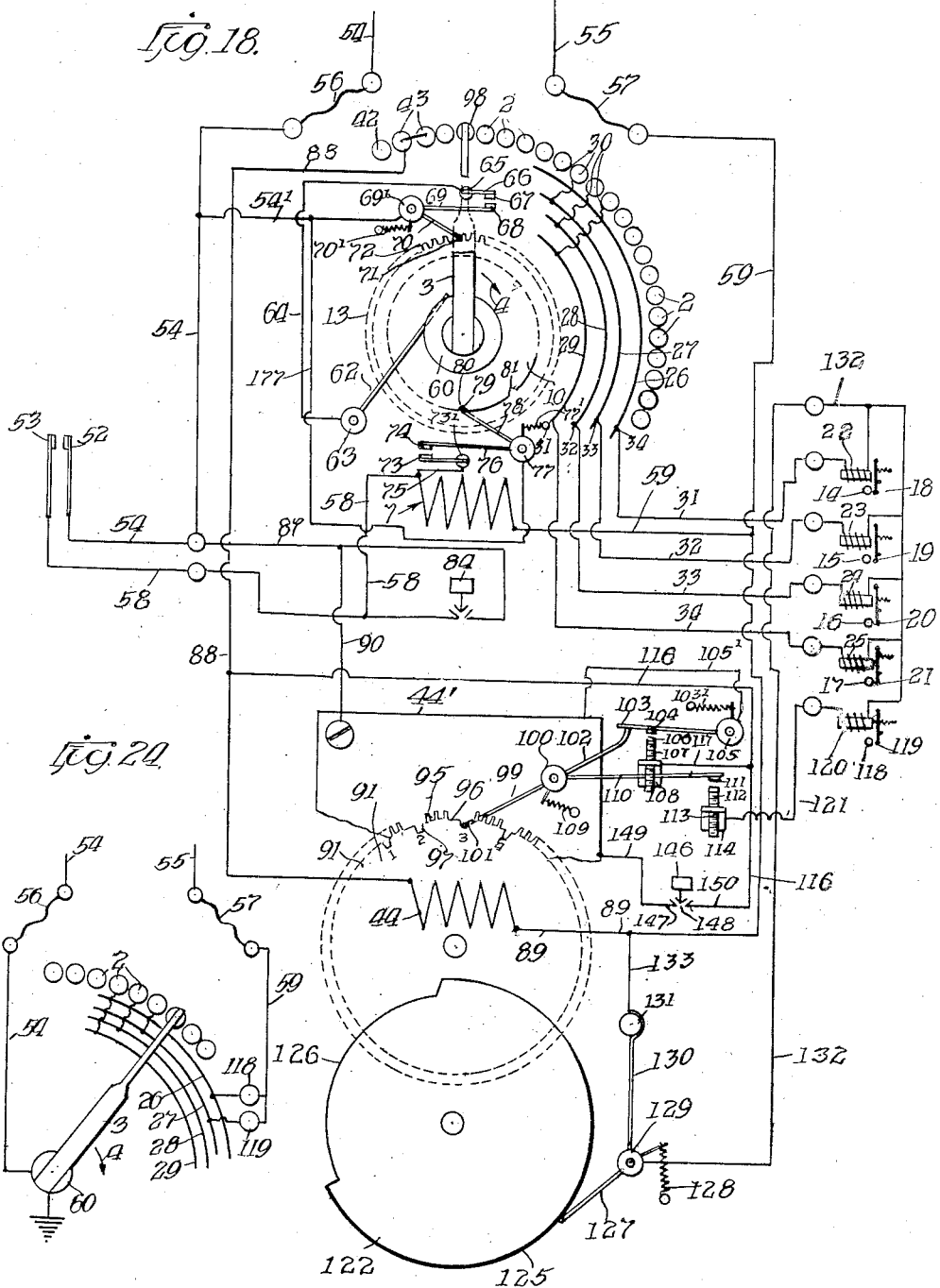

Dec. 4, 1934.  F. B. LITTLE  1,983,236
MECHANISM FOR CONTROLLING ELECTRIC CIRCUITS
Filed March 4, 1932   6 Sheets-Sheet 6
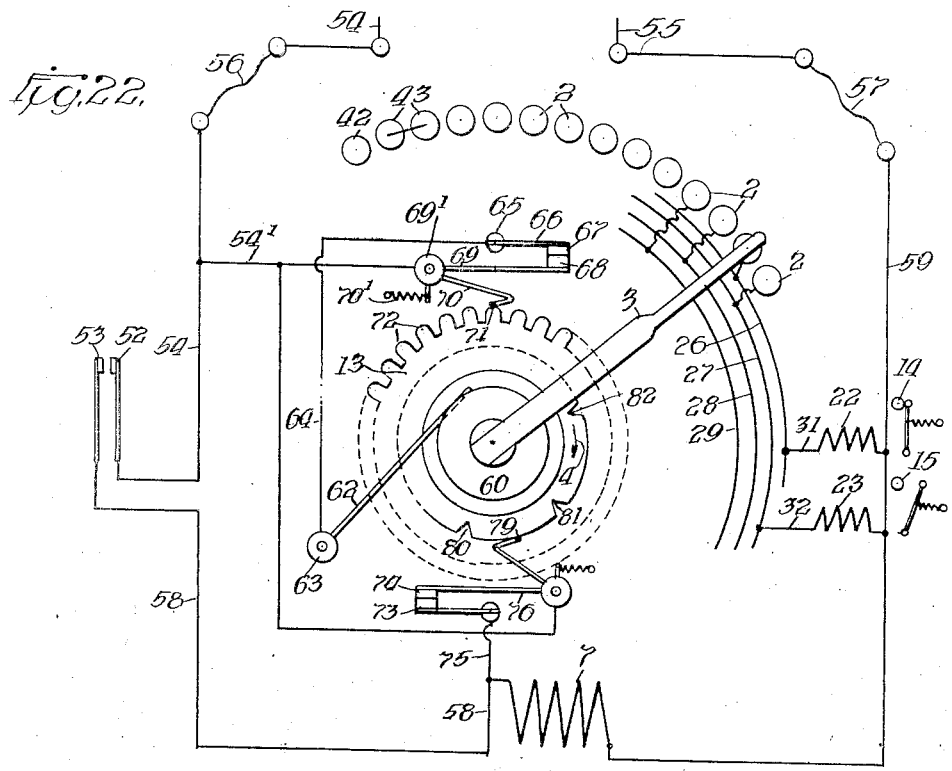

Patented Dec. 4, 1934

1,983,236

UNITED STATES PATENT OFFICE 1,983,236

MECHANISM FOR CONTROLLING ELECTRIC CIRCUITS

Frederick B. Little, Chicago, Ill.

Application March 4, 1932, Serial No. 596,763

5 Claims. (Cl. 58—38)

This invention relates to improvements in automatic mechanisms for closing associated electrical circuits in predetermined orders and at predetermined times for the production of signals or other desired results, and has special reference to simple automatic mechanism for indicating predetermined times such as hours and quarter hours.

The object of the invention is to provide a simple, durable mechanism especially adapted for use in connection with a clock for sounding chimes at the quarter hours and for striking the hours.

A special feature of the invention is simplicity and relatively low cost of production, as well as its reliability and durability in use.

To the accomplishment of the above and associated ends, the invention consists in the means hereinafter fully described in the specification and particularly pointed out in the appended claims. The accompanying drawings, which form part of this specification, and the following description set forth a preferred embodiment exemplifying the invention, such disclosed arrangement of parts, devices and circuits constituting, however, but one of various applications of the principle of the invention.

The invention will be more readily understood by reference to said drawings in which:—

Fig. 1 is a front elevational view showing one embodiment of the invention and arranged for closing circuits for indicating the quarter hours and the hours;

Fig. 2 is a rear elevational view of the mechanism shown in Fig. 1;

Fig. 2a is an elevational view of an associated circuit closer for use in connection with a time device such as a clock;

Fig. 3 is a top-plan view of the circuit closer shown in Fig. 2a;

Fig. 4 is a vertical section on the line 4—4 of Fig. 2a;

Figs. 5 and 6 are detail elevations of the circuit closing and opening device illustrating the action of the circuit closer shown in Fig. 2a;

Fig. 7 is a fragmentary elevation of a part of the mechanism shown in Fig. 1, arranged and adapted to open a circuit, which has been closed, by means different from the closing means to prevent deterioration of the circuit closing contacts;

Fig. 8 is a fragmentary elevation of the mechanism for closing and opening the circuit for indicating the quarter hour periods;

Fig. 9 is a fragmentary front elevation of part of the mechanism shown in Fig. 1, particularly arranged to close and open the circuit for indicating the hours;

Fig. 10 is a view similar to Fig. 9 but showing the parts in different positions;

Fig. 11 is a horizontal section on the line 11—11 of Fig. 1;

Fig. 12 is a vertical section on the line 12—12 of Fig. 1;

Fig. 13 is a horizontal section on the line 13—13 of Fig. 1;

Fig. 14 is a fragmentary section on the line 14—14 of Fig. 1;

Fig. 15 is a fragmentary, vertical section on the line 15—15 of Fig. 1;

Fig. 16 is a fragmentary, vertical section on the line 16—16 of Fig. 1;

Fig. 17 is a fragmentary, horizontal section on the line 17—17 of Fig. 1;

Fig. 18 is an electric circuit diagram;

Fig. 19 is a fragmentary elevation showing a slightly modified arrangement of the hour indicating mechanism;

Fig. 20 is a horizontal section on the line 20—20 of Fig. 19;

Fig. 21 is a partial electric circuit diagram illustrating the circuits used in the form of mechanism shown in Fig. 19;

Fig. 22 is an enlarged, diagrammatic view of the signal operating apparatus and a diagram of the associated circuits showing a circuit closed for operating one of the signals which produces an inductive load;

Fig. 23 is similar to Fig. 22 except that the signal circuit is shown open; and

Fig. 24 is a similar view showing where a non-inductive signal device is used.

In said drawings, 1 is a flat panel of insulation material upon which most of the associated circuit closing and opening mechanism is mounted, and which panel could be mounted in any suitable manner, such as in a suitable case or as forming the front of a suitable case not shown.

Upon the upper part of the panel 1 is arranged a circular series of fixed contacts designated generally by 2. In the present instance, this series of contacts 2 consist of sixty similar small contacts and a contact arm 3 is arranged to sweep around the circle in a clock-wise direction, as shown by the arrow 4 on Fig. 1 and the arrow 4' on Fig. 2, and its outer free end successively rests upon the contacts 2.

The arrangement is such that the arm 3 moves at the rate of one complete revolution in one minute. The contacts 2, as shown in Fig. 16, consist of headed pins 5 rigidly mounted in the panel 1 and hence they are insulated from each other unless otherwise electrically connected. These pins project through the panel and their inner ends are interconnected in a suitable manner to produce the indications desired. The particular arrangement illustrated will be fully described hereinafter.

The contact making arm 3 is rigidly mounted at the center of the circle of contacts 2 upon a shaft 6 which is a rotating shaft of a self-starting electric motor 7 arranged to rotate the shaft 6 at the rate of one R. P. M.

Two forms of impulse or indication initiation apparatus are shown in the drawings, one, shown in Figs. 1, 16, 22 and 23, is especially arranged and adapted for use in connection with indicators which cause an inductive load to be produced and which if not guarded against, would tend to burn out or deteriorate the contacts 2 and arm 3, and the other, best illustrated in Fig. 24, which is arranged and adapted for use with signaling or indicating devices, such as incandescent lamps which are non-inductive.

In the form shown in Figs. 1, 16, 22 and 23, the arm 3 is insulated from the shaft 6, being rigidly mounted on a center hub 8 which, in turn, is rigidly mounted on a collar 9 of insulating material and which, in turn, is rigidly mounted on a disk 10 rigidly secured on a hub 11. The hub 11 is rigidly mounted on the outer end of the shaft 6. The motor 7 is rigidly mounted on the panel 1 by screws 12. In addition to the disk 10, there is another and larger circular plate 13 rigidly mounted on the hub 11. The arm 3, the disk 10 and the plate 13 all rotate with the shaft 6.

The arm 3 and contacts 2 are for the purpose of successively closing circuits which will provide certain audible or visible indications. In the form of device illustrated, these indicators are represented in Fig. 18 as chime tubes 14, 15, 16 and 17, intended to correspond with desired tones to be produced in chiming the quarter hours similar to clocks which chime the quarter hours by tones in groups of 4.

As illustrated, the tubes 14, 15, 16 and 17 are adapted to be individually sounded by associated hammers 18, 19, 20 and 21, respectively, operated by associated magnets 22, 23, 24 and 25, respectively, when their individual circuits are closed.

The tubes 14, etc., the hammers 18, etc., and the magnets 22, etc., constitute electrically operated devices or instrumentalities operable by the circuit controlling mechanism.

On the back of the panel 1 are mounted a series of four circular metal rings 26, 27, 28 and 29, and the inner or rear ends of some of the contact pins 2 are electrically connected to these rings, as best shown in Fig. 2 by connecting wires 30. In the form of mechanism shown, the contact pins 2 are divided in groups of four pins each, and the groups are separated by at least one dead or unconnected contact. As best shown in Fig. 2, the top contact is unconnected or dead. The arm 3 rests upon this contact after the hour has struck and until time to strike the first quarter. When this time has arrived, the motor 7 is started and the arm 3 begins to move in the direction of the arrow on Fig. 2 and rests successively upon the contacts 2, one a second, as long as the motor 7 continues to run. As shown, the first pin 2 which the arm 3 rests upon is connected to the inner circuit wire 29, the second with the circuit wire 28, the third with the circuit wire 27 and the fourth with the outer circuit wire 26.

As best shown in Fig. 18, these concentric circuit wires 26, 27, 28 and 29 are connected by wires 31, 32, 33 and 34, respectively, with the magnets 22 to 25, respectively, and the arrangement is such that when the arm makes contact with the several contacts 2, the magnets will be energized and the tubes struck.

After the first group 35 of four of the pins 2 for indicating the first quarter, there is a group 36 of three of the pins 2 which are not connected. In operation, the arm 3 is arranged and adapted to rest upon the middle pin of the group 36 of three pins until the end of the second quarter of the hour. At the end of the second quarter, the motor 7 is again started and the arm 3 sweeps forward over the next group 37, causing the operation of the magnets and the sounding of the tubes in the order arranged, then over an unconnected or dead pin 38, then over the next group 39 of four pins. This completes the chiming of the second quarter. After the group 39 there is another group 40 of three dead pins and the arm 3 is adapted to rest upon the center one of the three until the end of the third quarter hour. At the end of the third quarter, the action is the same as described except that there are three groups of four each, separated by single pins, and at the end of the fourth quarter the action is similar except that there are four groups of four pins each. After the last group 41 there is arranged a dead pin 42 and then a group 43 of two pins connected together next to the top pin. The group 43 of two connected pins are for the purpose of starting a second motor 44, see Fig. 11, which operates the mechanism for striking the hours. This hour striking mechanism will be described later.

The circuit closing mechanism shown in Figs. 2a to 6, inclusive, is for the purpose of starting the motor 7 which rotates the arm 3. This circuit closing mechanism is arranged in connection with a shaft 45 which represents the shaft which carries the minute hand of an associated time piece such as a clock. The shaft 45 rotates once in an hour. Geared to this shaft is a second shaft 46, the gearing being 4 to 1 so that the shaft 46 rotates once in each quarter hour. The shaft 46 carries rigidly mounted thereon, a pair of cams 47 and 48. These cams are made of suitable insulating material. A pair of resilient arms 49 and 50 are provided rigidly mounted at one end on an insulation block 51 and carrying cooperating electrical contacts 52 and 53, respectively. The free ends of the arms 49 and 50 rest with light spring pressure on the cams 47 and 48, respectively. As the cams rotate the arms are each raised, the contacts 52 and 53 being separated as shown in Fig. 2a. The ends of the springs and the drops in the cams are arranged and adapted to drop the arm 49 first and close the contacts 52 and 53, thus closing an electric circuit. Then a few seconds later, the arm 50 which carries the lower contact 53 drops off the shoulder of the cam and separates the contacts 52 and 53, thus again opening the circuit and which remains open until another quarter hour has elapsed.

Electric current is supplied to the mechanism by the supply wires 54 and 55 at the top of the panel 1, the supply current passing through the fuses 56 and 57 to protect the circuit.

As shown in the electric circuit diagram, the current passes from the supply wire 54 and fuse 56 to the contacts 52 and 53 of the timing mechanism and from the contact 53 through the wire 58 to the motor 7 illustrated on the diagram 18 by its field coil only. From the field coil the current passes by wire 59 to the opposite supply wire 55. As the motor 7 is of the self starting kind, it will start when the motor circuit is closed by the contacts 52 and 53, that is, at the end of each quarter hour, in the form of mechanism shown. Current from the same source operates the visible or audible indicators 14 to 17, inclusive.

For passing the current to the arm 3, the hub 8 upon which it is mounted carries a disk 60 with a peripheral groove 61 and a spring wire contact 62 has its free end resting in the groove. The spring wire 62 is rigidly mounted at its opposite end in a rigid insulated post 63 and which is electrically connected by a wire 64 to a second insulated post 65 which carries a contact arm 66 having a contact 67. Opposed to the contact 67 is a co-operating contact 68 carried by an arm 69 mounted on a hub 69'. The hub 69' is pivotally mounted and carries an arm 70 which is provided at its free end with a transversely extending end projection 71 adapted to engage in the notches in the edge of the disk 13. The outer edge of this disk is provided with sixty teeth 72, one for each of the contacts 2, and a light tension spring 70' yieldingly holds the projection 71 in contact with the toothed edge of the disk 13.

The hub 69' is shown as connected to the supply wire 54 by a wire 54'. The arrangement is such that when the arm 70 is swung up by the projection 71 passing over one of the teeth 72 on the disk 13, the circuit is closed by the contact 68 rising against the contact 67. It will now be clear that the current will be opened at this point when the projection 71 drops into the next notch.

When the projection 71 drops into one of the notches between the teeth 72, the circuit is broken by the quick and relatively wide separation of the contacts 67 and 68, thus precluding the production of an objectionable arc at this point. Further, these contacts 67 and 68 are made of a suitable metal such as silver, which can stand considerable arc or heat without objectionable deterioration.

When the motor 7 is at rest, the arrangement is such that the arm 70 rests in a notch between two of the teeth 72 on the disk 13 and at such time the contacts 67 and 68 are separated. When the motor 7 starts to run, the disk 13 is rotated and the arm 70 is lifted as its end 71 passes over each tooth, thus momentarily closing the contacts 67 and 68, and also separating them again as the end 71 drops into each notch.

When the motor circuit has been momentarily closed, as described by the clock operated circuit closing contacts 52 and 53, the shaft 6 rotates and with it the disk 10. For keeping the motor circuit closed after the circuit is opened by the separation of the temporary circuit closing contacts 52 and 53, a pair of circuit closing contacts 73 and 74 are provided. The contact 73 is carried by a rigid insulated post 73' connected by a wire 75 to the supply wire 58, and the contact 74 is carried on the end of an arm 76 carried on a pivotally mounted hub 77. The hub 77 also carries an arm 78 having at its free end a portion bent at right angles to form a transverse projection 79 adapted to be yieldingly pressed against the outer edge of the disk 10 by a light tension spring 77' attached to the hub 77. The hub 77 is shown as connected to the hub 69' by a circuit wire 177 and thus connected to the supply wire 54. The disk 10 is provided with notches 80, 81, 82 and 83 on its periphery and the projection 79 at the end of the arm 78 is adapted to drop into these notches.

The arrangement is such that when the projection 79 is in one of the notches in the edge of the disk 10, the motor circuit closing contacts 73 and 74 are separated, and when the projection 79 rests against the outer periphery of the disk 10, these contacts are closed together, thus serving to keep the motor running.

The notch 80 in which the arm 78 is shown as resting in Fig. 18, corresponds with the rest period at the end of an hour. The notches 81, 82 and 83 correspond, respectively, with the rest periods at the end of the first quarter, the end of the second quarter, and the end of the third quarter.

As best shown in Fig. 8, when the motor begins to rotate, the end 79 of the arm 78 is forced out of the notch it is in and this action closes the contacts 73 and 74 together, thus passing current from the supply line 54 to the motor to keep it running until the end 79 enters the next notch in the edge of the disk 10. It will be understood that the current is broken by the separation of the contacts 73 and 74 after the sounding of the chimes at the conclusion of each quarter hour. Further, when the motor begins to run, the end 71 on the arm 70 is lifted by passing over a tooth, thus closing the contacts 67 and 68 and sending current to the arm 3 through wire 64, post 63, arm 62 and grooved disk 60 upon which the arm 3 is mounted, thus sending the current to the proper signal device as the arm sweeps over the contacts 2. This signaling circuit is broken or opened every time the end 71 of the arm 70 enters one of the notches between the teeth 72 on the disk 13, by the separation of the contacts 67 and 68.

The closing and opening of the motor circuit and of the signal circuits is clearly shown in the diagrammatic views 22 and 23.

In Fig. 22 the contacts 67 and 68 are shown closed and arm 3 passing over one of the contacts 2, the projection 71 being on the top of one of the teeth 72. The signal circuit including the electro-magnet 22 is closed and the signal 14 is shown as being operated. In Fig. 23, the projection 71 is shown as having dropped down in a space between two of the teeth 72, and the contacts 67 and 68 are open. The arm 3 has not yet left the contact 2 upon which it is shown in Fig. 22, but the signal circuit has been opened and consequently no undesired results can occur as the arm 3 leaves the contact 2, although it does leave it slowly.

While I have thus described a means for preventing the deterioration of the arm 3 and contacts 2, such arrangement is not an absolute necessity and, in some instances, the toothed disk 13 and associated parts may be eliminated and the current passed directly to the arm 3 and so to the contact points 2.

In Fig. 24 there is illustrated a circuit and mechanism especially adapted for closing the signal circuits when non-inductive signal devices are used. In said figure, the arm 3 is shown as being directly connected to one of the current supply wires and the signal devices 118, 119 as connected to the other circuit wire. These signal devices are illustrated as lamps which are used to indicate any suitable signal device which is non-inductive in operation.

Besides the means for closing the circuit for starting the mechanism into action, viz., the clock contacts 52 and 53, there is provided a means for manually initiating the action, consisting of a push button switch 84 mounted in the panel 1 and arranged to close the supply circuit by forcing a spring contact bar 85 against a co-operating contact bar 86 Fig. 13. As shown in Fig. 18, this switch 84, when closed, connects the line 54 by the wire 87 to the line 58 to start the motor 7.

In addition to the chiming mechanism for the quarter hours, mechanism is provided for striking the hours after the sounding of the chimes at the end of the fourth quarter.

The switch arm 3 is used to initiate the action of the striking mechanism.

The unconnected or dead contact post 42 of the circle of contacts 2 produces a pause of one second while the arm 3 is passing over same, and the group 43 of two of the contacts are used to start the motor 44 which runs the mechanism for causing the striking of the hours.

As shown in Fig. 18, this group 43 of the contacts 2 is connected by a circuit wire 88 to the coil of the motor 44. And when the arm 3 contacts with the contacts 43, current passes through the motor coil 44 and by the circuit wire 89 to the return circuit wire 59.

The motor 44 and its associated mechanism are mounted on a metal plate 44' and this plate is electrically connected to the supply wire 54 by a connecting wire 90.

The hour striking mechanism, as shown in Fig. 1, consists of a mutilated toothed wheel 91 geared to the shaft 92 of the motor 44 by gears 93 and 94 arranged to cause the wheel 91 to rotate at the rate of one revolution in five minutes, the motor 44 representing any suitable power means for producing such movement.

The periphery of the wheel 91 is provided with teeth 95 arranged similarly to an hour striking wheel in a mechanical clock, that is, there is one tooth for each stroke and they are divided into suitable groups for successively striking the hours, one tooth for one o'clock, two teeth for two o'clock, and so on. The teeth are cut away between the groups as shown at 96 and in the preferred form of the device, a notch 97 is formed in the rim of the wheel 91 within the cutaway space 96. It should be understood that after the arm 3 starts the motor 44, it sweeps on and leaves the group 42 of the contacts 2 and comes to rest upon the unconnected or dead contact 98 where it remains at rest until the end of the first quarter hour. The arm 3 having left the contacts 42, the circuit is broken at this point and other means are provided for supplying current to the motor 44 to keep it running as long as necessary for striking the hour.

This mechanism consists of a switch lever 99 pivotally mounted on the plate 44' at 100 and provided on its free end with a transversely extending arm 101 arranged to drop in between the teeth 95 on the wheel 91 and also to drop down into the notches 97. Beyond the pivot point 100, the lever 99 has a free end 102 adapted to contact with the free end of a contact arm 103. The arm 103 carries a contact 104. The arm 103 is mounted on the panel 1 at 105 and is grounded to the plate 44' by a wire 105'. A co-operating contact 106 is provided on the end of a screw 107 which is adjustably mounted in a fixed bracket 108. The bracket 108 is likewise mounted on the panel 1. A spring 109 is provided for yieldingly holding the lever 99 pressed against the wheel 91 and the contacts 104 and 106 open when the arm 101 drops down into one of the notches 97.

The pivotal support 100 carries another arm 110 which carries a contact 111 at its free end for co-operation with a contact 112 on the point of a screw 113 adjustably mounted in a bracket 114.

When the motor 44 starts, the wheel 91 begins to rotate in the direction of the arrow 115, Fig. 1, and the first action is to cause the arm 101 of the lever 99 to rise out of the notch 97 in which it is resting. As the arm rises out of the notch, it swings the lever 99 up swinging the opposite end 102 down and allowing the contact 104 to rest down on the contact 106.

The lever 103 is held yieldingly pressed down by a light tension spring 103' and when the lever 102 is swung, the contact 104 is closed against the contact 106 and the current passes from the plate 44' through the wire 105' and through the contacts 104 and 106 to the bracket 108. These contacts 104 and 106 remain closed or in contact until the wheel 91 is rotated far enough to let the arm 101 drop down into the next notch 97. This switch is for closing and opening the circuit of the motor 44 and for this purpose the bracket 108 is connected to the motor circuit wire 88 by a wire circuit 116 and a wire 117, thus preserving the motor circuit closed after it has been opened by the arm 3 leaving the contacts 43.

Besides rising out of the notch 97, the arm 101 also rises and falls as each tooth 95 of the wheel 91 passes under same. This additional movement up and down serves to close and open the contacts 111 and 112 once for each tooth and suitable striking mechanism is provided to be operated by this action. The two operative positions of these parts are clearly illustrated in Figs. 9 and 10.

In Fig. 9, the toothed wheel 91 is shown as having moved far enough to lift the projection 101 out of the notch 97 and in this position the motor circuit has been closed but the striking circuit is still open. In Fig. 10, the wheel 91 is shown as having moved far enough to lift the projection 101 to the top of one of the teeth 95 and in this position the striking circuit has been closed, the motor circuit remaining closed until the projection 101 drops down into the next notch 97.

For causing the actual hour indications, there is shown a tube 118 similar to the tubes for sounding the quarter hours.

A hammer 119 is adapted to be operated by an electro-magnet 120. One end of the magnet coil is connected by a wire 121 to the bracket 114 and through the bracket, screw 113, contacts 111 and 112 and lever 110 to the plate 44' and supply wire 54, that is, of course, when the contacts 111 and 112 are closed. Each time the projection 101 passes over one of the teeth 95, the mechanism operates to give a stroke and once the toothed wheel 91 is started, it continues to turn until the hour is struck, when the end 101 drops into the next notch 97 and breaks the motor circuit.

It is desirable, at times, to stop the striking of the quarters and hours, usually from 10 P. M. to 7 A. M. and simple means are provided for this purpose.

A cam wheel 122 is provided geared to the wheel 91 by gears 94 and 124 in a 1 to 2 ratio so that the cam wheel will rotate once in twenty-four hours, whereas the toothed wheel 91 rotates twice in twenty-four hours. The cam wheel 122 has a circular periphery 125 which is cut away for part of the circumference as shown at 126 and a pivotally mounted lever 127 is pressed against the periphery by a spring 128.

The lever is mounted on a pivoted hub 129 and this hub carries a second arm 130, the free end of which is adapted to be pressed against a fixed stud 131. The arm 130 is slightly yielding to permit the spring 128 to press the arm 127 against the cam and at the same time cause the arm 130 to contact with the stud 131.

The return connections from all of the striking magnets 22—25 and 120 connect with a common return 132 which leads down to the hub 129 and through the arm 130 to the stud 131 and by a connecting wire 133 to the return circuit wire 89 and thus to the lead wire 55, that is, of course, when the arm 130 is in contact with the stud 131. To provide this control circuit, the cam wheel 122, as best shown in Fig. 12, is insulated from the rest of the apparatus being mounted on an insulation bushing 134 and held in place by a spring pressed washer 135.

In Fig. 1, the arm 127 is shown as resting on the circular periphery 125, but when the cam turns to bring the cut-away portion 126 opposite to the arm, the arm will be swung in by the spring 128 and the circuit will be broken between the arm 130 and stud 131 and then none of the striking magnets can operate even though the control arm 3 continues to rotate.

Instead of the notches 97 being provided in the toothed wheel 91, they may be provided in a separate disk and another switch lever provided for closing and opening the circuit of the motor 44. Such a form is illustrated in Figs. 19 and 20 and the associated electric circuits are shown in Fig. 21.

In this form a toothed wheel 136 is provided, having teeth arranged similarly to those of the toothed wheel 91, and a separate notched disk 137 is provided, fixed on the same shaft, the notches 138 of which are arranged similarly to the notches 97 in the wheel 91. The wheel 136 and disk 137 are fixed to rotate together. Two spring controlled levers 139 and 140 are provided, the lever 139 for the toothed wheel, and the lever 140 for the notched disk.

These levers are pivotally mounted on a stud 141 and are yieldingly pressed against the toothed wheel and notched disk respectively. Each of the levers control a circuit closing contact 142 for lever 139, and 143 for lever 140. Adjustable co-operative contacts 144 and 145 are provided as in the first form, 145 and 143 for closing and opening the motor circuits, and 144 and 142 for closing and opening the striking circuit, as best shown in the electric diagram, Fig. 21.

Besides the means for automatically closing the circuit of the motor 44, manually operable means are provided in order that the striking apparatus may be properly set if it should become out of register with the actual time. This consists of a push button switch 146 adapted when pushed in to connect a contact arm 147 with a contact member 148 and, as best shown in Fig. 18, the connecting of the members 147 and 148 supplies current to the motor 44. This is accomplished by a connecting wire 149 from one side of the switch to the metal plate 44', and through the plate and connections to the supply wire 54, and a connecting wire 150 at the opposite side which connects with the wire 116 to the motor. Consequently, while the arm 3 is on a dead pin, the striking mechanism can be manually operated.

It is obvious that the cam wheel 122 could readily be made to cut out the striking mechanism during any period desired.

As many modifications of the invention will readily suggest themselves to one skilled in the art, I do not limit or confine the invention to the specific details of construction or combinations of parts or devices herein shown and described.

I claim:

1. In a quarter hour indicating mechanism, a series of electrically operable signals, a self-starting electrical motor, a shaft rotatable by the motor and adapted to rotate at a substantially uniform speed, a circular series of electrical contacts for controlling said signals, an arm carried by the shaft and adapted to contact with said series of contacts, time controlled means for closing the motor circuit for starting same, the contacts in said circular series arranged in groups connected with said signals and unconnected contacts between said groups, and means operable by the motor for opening the motor circuit after a predetermined number of signals have been operated and causing the arm to remain stationary on one of the unconnected contacts until the motor is again started.

2. In a mechanism of the kind described, a series of electrically-operated signals such as clock chimes for designating the quarter hours, means for directing electric current to operate the signals, and including a source of supply of alternating electric current, a constant speed synchronous self-starting motor connected to be driven by said alternating current, a rotatable distributor for directing current to the several signals in succession, a simple train of gears operatively connecting the motor to the distributor for rotating same at a suitable constant speed for causing the successive operation of the signals after time intervals of substantially uniform duration, and an electrically-operable signal such as a clock chime for designating the hours, a rotatable switching member for sending electric current to the chime striking mechanism for operating same, a constant speed self-starting synchronous motor connected to be driven by said alternating current, a simple train of gears operatively connecting the motor with the switching member for rotating it at a constant speed, and means operable by the first-mentioned motor for closing the supply circuit of the second-mentioned motor to operate same to strike the hours after the operation of the quarter-hour chimes for the fourth quarter.

3. In a mechanism of the kind described, a source of electric current, a series of electrically-operable signals, a circular ring of contacts respectively connected to the signals, a rotatable arm for distributing the current to the circular series of contacts for respectively operating the signals in sequence, a toothed wheel concentric and rotatable with the arm, a circuit make-and-break lever pivotally mounted in relation to the wheel and yieldingly held against the edge thereof, and whereby said lever is oscillated by the teeth when the wheel is rotated, a pair of co-operating contacts for breaking the circuit to the signals, one of said contacts positioned on said lever, there being one tooth on the wheel for each time a signal is to be operated and the lever arranged to separate said contacts before the rotatable arm leaves any particular contact.

4. In an electrically-operated hour-striking mechanism, an electrically-operable signal such as a chime, a wheel adapted to be rotated at the rate of one revolution in twelve hours, projections on the edge of the wheel arranged in groups to represent the hours, a chime-operating electric circuit, a pair of cooperating contacts in said circuit, a lever pivotally mounted between its ends in relation to the teeth on the wheel and having an end yieldingly held against said teeth, one of said cooperating contacts being arranged on the outer end of the lever, the arrangement being such that as the wheel is revolved the contacts will be closed and opened to operate the chime once for each tooth on the wheel, and a yielding arm on the outer end of the lever, a second pair of cooperating contacts, one of which is on said yielding arm, an electric motor for rotating said wheel, the wheel having deep notches between the groups of teeth, said second pair of contacts being in the motor circuit, the arrangement being such that when the wheel-contacting end of the lever rises out of a deep notch the second pair of contacts are closed to keep the motor running and remain closed until the lever end enters the next-succeeding deep notch.

5. In a mechanism of the kind described, a source of electric current, a plurality of electrically operated instrumentalities, a circular ring of contacts connected respectively to the instrumentalities, a rotatable arm for distributing the current to the circular series of contacts for respectively operating the instrumentalities in sequence, a toothed wheel rotatable with said arm, a circuit make and break lever pivotally mounted in relation to said wheel and yieldingly held against the toothed edge thereof and whereby the lever is oscillated by the teeth when the wheel is rotated, a pair of cooperating contacts for breaking the circuit to the instrumentalities, one of said contacts positioned on said lever, there being one tooth on the wheel for each time an instrumentality is to be energized, and the lever arranged to separate said contacts before the rotatable arm leaves any particular contact in said circular series.

FREDERICK B. LITTLE.